Figure 1:
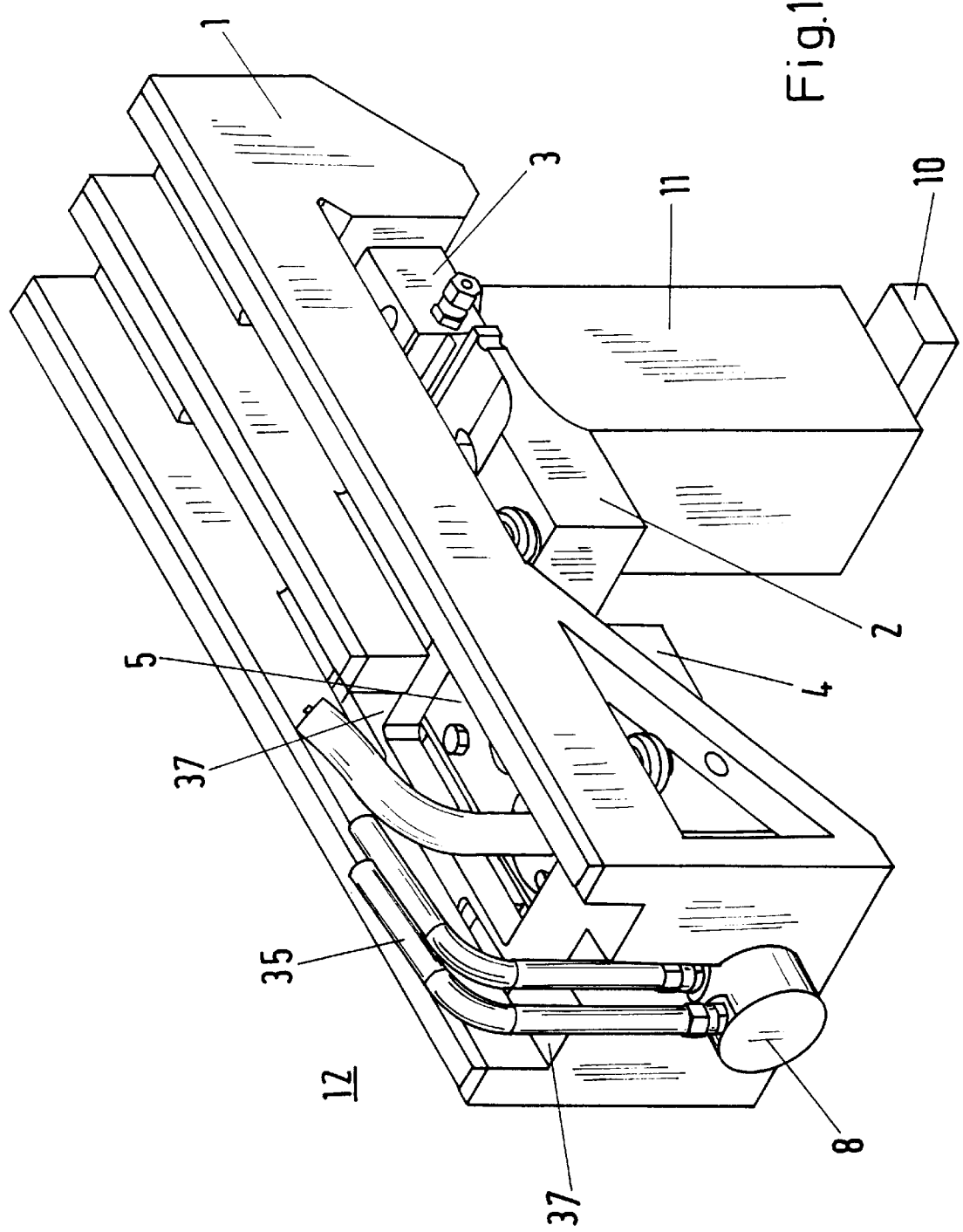

United States Patent [19]
Martin

[11] Patent Number: 5,927,046
[45] Date of Patent: Jul. 27, 1999

[54] SEALING DEVICE FOR ASEPTICALLY FILLED PACKAGES UNDER GERM-FREE CONDITIONS

[75] Inventor: Peter Josef Martin, Aeisenheim, Germany

[73] Assignee: Tetra Laval Holdings & Finance, S.A., Pully, Switzerland

[21] Appl. No.: 08/966,227

[22] Filed: Nov. 7, 1997

[30] Foreign Application Priority Data

Nov. 19, 1996 [DE] Germany .................. 196 47 775

[51] Int. Cl.⁶ .................. B65B 51/10; B32B 31/00
[52] U.S. Cl. .................. 53/373.7; 53/370.7; 53/371.8; 53/372.6; 53/375.6; 53/DIG. 2; 156/580.1
[58] Field of Search .................. 53/167, 373.7, 53/373.8, 375.6, 370.7, 371.8, 372.6, DIG. 2, 565, 36.7; 156/580.1; 426/399

[56] References Cited

U.S. PATENT DOCUMENTS

| | | | |
|---|---|---|---|
| 3,076,300 | 2/1963 | Luedi et al. | 53/367 |
| 3,516,225 | 6/1970 | Faucheron | 53/551 |
| 3,956,975 | 5/1976 | Egleston et al. | 53/371.8 |
| 4,145,236 | 3/1979 | Neumayer et al. | 53/371.8 |
| 4,241,560 | 12/1980 | Deimel et al. | 53/DIG. 2 |
| 4,375,145 | 3/1983 | Mosse et al. | 53/425 |
| 4,788,811 | 12/1988 | Kawajiri et al. | 53/167 |
| 5,881,535 | 3/1999 | Gliniecki et al. | 53/410 |

FOREIGN PATENT DOCUMENTS

| | | | |
|---|---|---|---|
| 1326506 | 3/1962 | France | 53/373.7 |
| 2305346 | 10/1976 | France | |
| 1586282 | 4/1970 | Germany | |
| 33 22 402 | 1/1985 | Germany | |

OTHER PUBLICATIONS

Wasserhydraulik auf dem Prufstan, Jan./Feb. 1996.

*Primary Examiner*—Lee W. Young
*Assistant Examiner*—A. Dexter Tugbang
*Attorney, Agent, or Firm*—Paul & Paul

[57] ABSTRACT

A device for sealing the closing seam of a germ-free filled package made from plastic coated paper in germ-free conditions in a clean room; where, in the direction of movement of a sealing jaw, a drive mechanism having a hydraulic cylinder using germ-free water as the hydraulic fluid, and being provided with a piston rod, is connected to the sealing jaw. Behind the sealing jaw the drive member is fixed in a stationary manner to a retaining frame. In front of the sealing jaw and in the direction of movement of the sealing jaw, a counter jaw is securely fixed onto the retaining frame.

19 Claims, 8 Drawing Sheets

SEALING DEVICE FOR ASEPTICALLY FILLED PACKAGES UNDER GERM-FREE CONDITIONS

The invention relates to a device for sealing the closing seam of a germ-free filled package made from a support material, for example, paper, coated with plastics, under sterile conditions in a clean room, in which, in the direction of movement of a sealing jaw behind the sealing jaw, a drive means is connected to the sealing jaw, and is fixed in a stationary manner to a retaining frame, and in front of the sealing jaw, in the direction of movement, a counter jaw is securely fixed onto the retaining frame.

Numerous sealing devices for closing the seam on a gabled package made from plastics-coated paper are known, wherein, however, sealing is not done in a clean room. Other sealing devices weld the gabled package using hot air, such that the seam surfaces to be joined together are exposed to hot air in order to make the surfaces concerned hot and weldable. This hot air is not germ-free, however, and the whole system cannot be encapsulated, as in the case of a sterile room, as the apparatuses and some areas in the clean room would overheat considerably. Flows are created for transporting the hot air which lead to considerable turbulence, whereby in turn germ-containing air even flows into the aseptically filled packages and thereby make the interior of the package non-sterile. Furthermore, hot air jets have many narrow channels and corners which cannot be perfectly sterilised or made germ-free. Air coming out of these hot air jets is disadvantageously always contaminated to some degree.

With other non-aseptic filling and sealing methods for packages for foodstuffs, cam controls and mechanical systems moveable by levers and bearings are employed. With these, however, lubricants are indispensable, which again give rise to a non-aseptic atmosphere.

The object of the invention is therefore the provision of a device of the type described in the introduction, in which, while guaranteeing high production reliability, the drive for the sealing device can operate without a hermetically sealed special housing under germ-free conditions, and the device is maintenance-friendly.

According to the invention, this object is solved in that the drive is provided with a hydraulic cylinder which is driven with germ-free water as the hydraulic fluid, and is provided with a piston rod connected to the sealing jaw. A cylinder and piston and germ-free water as the hydraulic fluid are known per se as drive means. Such apparatuses are never involved with processing in a clean room or a sterile room, however. The very materials used for the known hydraulics, and the lubrication methods related to them, do not allow a hydraulic drive in a clean room. The person skilled in the manufacture of germ-free filled packages knows that domestic and foreign foodstuff regulations prohibit the use of hydraulic fluids in the proximity of a germ-free filled package. Almost all parts and apparatuses of the sealing device according to the invention have stainless steel surfaces, some of which are even electro-polished in order to provide easily cleanable and non-rusting surfaces which could, inter alia, come into contact with the goods to be packaged. By means of the invention, in an unexpected manner the solution is proposed of providing a hydraulic cylinder with a piston rod for the drive means and to operate the drive means with germ-free water. There are hydraulic drives which are driven by water which is not sterile. By the addition of chemical agents, which are inexpensive to acquire, the normal water (for example from the tap) can be made germ-free. There are, for example, tablets which have silver ions as the active substance, for sterilising the water. These tablets sterilise tap water in broad aseptic ranges so that the number of germs per volume unit of water required for aseptic packaging of foodstuffs in packages of the type described herein can be easily obtained. It has now been shown that the hydraulic cylinder of the drive needed for the jaw for approaching and pressing against the counter jaw can also be driven perfectly well with sterilised water. There are methods for measuring the concentration of germs so that over a long operating period the concentration of germs in the water used according to the invention as the hydraulic fluid can also be measured and monitored. Further additions of tablets over time allow the permissible concentration of germs to be maintained. Although leaks in a hydraulic drive cannot be excluded, the drive means according to the invention with the hydraulic cylinder actuated by means of the germ-free water can also be arranged in a clean room and thus directly move the sealing jaws against the counter jaws, so that the sealing procedure can take place in a clean room. In this way, advantageously, a special housing is not required and nevertheless the device is maintenance-friendly and guarantees perfect operation as the distance between the actual drive means and the sealing jaws being driven can be kept small and thereby the whole device can be kept really compact.

It is particularly advantageous in this case when according to the invention the axis of the piston rod connected to the sealing jaws lies in the line of the direction of movement which is the principal line of force from the drive means via the sealing jaw to the counter jaw. In this way the sealing device according to the invention can not only be configured in a very compact manner and with reliability of production, but also the power required for operation is provided from the hydraulic cylinder along this principal line of force to the axis, and all forces act up to the front upon the contact surfaces of the sealing jaw in this direction of the axis. In this way no offsets are necessary, no power is lost, and there are no undesirable tolerances. The retaining means for the whole movable sealing unit are in this way not stressed and do not suffer from abrasion.

It is further advantageous according to the invention when the hydraulic cylinder of the drive is fixed to the machine drive by means of a cam control. Outside the clean room, for example underneath a large table for the device according to the invention, there runs a main drive shaft onto which cams are also fitted. Valves (preferably a positive one and a negative one separate therefrom), are controlled by these cams and provide corresponding signals to the hydraulic cylinder for the forwards movement towards the front surface of the sealing jaw, or for backwards movement in the opposite direction. By means of the cam control of the control valves, very short control times are obtained. When only short welding and other movement times are available for the sealing unit, very short control times are obtained precisely by this cam control described. By permanently connecting the hydraulic cylinder to the machine drive, namely by means of the cam control described, it acts as a forced drive. This has the advantage that the use of water as hydraulic fluid delivers a 1:1 drive ratio (while hydraulic oil, for example, delivers a drive ratio of only approximately 0.8). In this way there are no delays, so for example when starting, power is immediately developed on the sealing jaws. In this way there is operation with reliable functioning with high cycle time and short feed times, wherein, for example, the hydraulic cylinder advances the sealing jaw, allows it to dwell there at a desired, defined pressure for a certain time, and withdraws it again, while new packages for sealing are conveyed into the gap between the jaw and counter jaw, and so forth.

In order to adjust the front surfaces of jaw and counter jaw it is particularly advantageous according to the invention when the moveable sealing unit is attached to a retaining plate between the drive means and front surface of the sealing jaw, which retaining plate is arranged such that it is moveable in a translatory manner on the retaining frame substantially parallel to the direction of movement of the sealing jaw. This attachment is preferably removable and means that the entire sealing unit, in particular the sealing jaw, can be removed together with the retaining plate from the retaining frame, and taken off in one piece. In this way the device is maintenance-friendly and can be cleaned easily. Further, the sealing jaw can be adjusted in the direction of movement of said sealing jaw by means of its integral connection to the retaining plate, as the whole unit can be moved forwards and backwards in a translatory manner in said direction of movement, for example in order to set the correct size of gap. Only a very few manual movements are needed for adjustment in the direction of movement of the sealing jaw.

It is also advantageous when according to the invention the moveable sealing unit is pivotable with respect to the retaining plate about a pin arranged substantially vertically and at right angles with respect to the direction of movement of the sealing jaw. Adjustment is also necessary in relation to the parallel setting of the respective front surfaces of the sealing jaw on the one hand and of the counter jaw on the other hand, and by means of these measures according to the invention is easily possible. By unscrewing (for example, four) screws, the moveable sealing unit can be quickly and easily released from the retaining plate, so the pin still projecting from the sealing unit alone takes over the retaining function. This pin is substantially vertical, so the sealing unit can be pivoted in an approximately horizontal plane resulting from this. It is therefore possible, for example, to move the sealing unit in a translatory manner in the forward direction of movement, until the two front surfaces of jaw and counter jaw are adjacent. Parallelism is then guaranteed. In this position, the sealing unit is again screwed tightly to the retaining plate or fixed in some other manner, so that afterwards, even with repeated translatory movement of the retaining plate, the sealing jaw is always exactly and correctly parallel to the counter jaw. The very simple and yet precise possibility for adjustment is evident.

In a further advantageous configuration of the invention, a "mushroom" is inserted between the piston rod of the drive means and the moveable sealing unit. This allows disconnection of the sealing unit from its drive for adjustment. The design and use of a mushroom is known per se in other fields. The use of the mushroom in the device according to the invention between the drive means and sealing unit makes simple, reliable and yet adjustable construction possible. In this way an axis adjustment can be made at any time. Advantageously, the piston rod of the hydraulic cylinder has a thread onto which the mushroom is screwed. A lock nut can fix the respective position selected. For adjustment, for example when the front surfaces of the jaws must be moved into contact with one another, the force for moving the sealing unit in the direction of movement described is produced in a translatory manner by means of the hydraulic cylinder of the drive means. If afterwards the setting of a certain size of gap between the front surfaces of the jaws is desired, this can easily be done by rotation of the mushroom described.

It is further advantageous when according to the invention there are fitted, extending in the direction of movement of the sealing jaw, on opposite edges of the retaining plate, guide rails with a V-shaped cross-section, the V cross-section of which tapers towards the outside, and which are held by two pairs of rollers with a corresponding V-shape on their periphery, and when one pair of rollers is arranged on the retaining frame in a centrically rotatable manner and the opposite, other pair of rollers is eccentrically rotatable. With the device according to the invention currently being used, the V-shaped guide rails are surface treated and screwed onto the edges of the retaining plate. However, it is also conceivable for the guide rails to be fixed in another manner to the retaining plate, or possibly even to configure them integrally with the retaining plate. The outwardly projecting tip of the respective V-shaped guides rails (seen in cross-section) projects into the tapering base of the V of the respective roller in the case of the arrangement for the pair of rollers described here, whereby a linear contact is produced. With each translatory movement of the retaining plate in the forward or backward direction of movement, any dirt accumulating on the guide rails can be pushed forward or backwards. This linear contact between the roller and guide rail ensures that the unwanted dirt is pushed in front of the respective roller to the end position. When the roller runs back relative to the guide rail, the dirt remains stuck in the front position where it has been pushed and can be wiped away very easily. The good possibilities for cleaning, and therefore the prerequisites for use in a clean room, are demonstrated in necessary, crucial places (between moveable and fixed, during adjustment).

The centrically rotatable arrangement of one pair of rollers opposite the eccentrically rotatable arrangement of the other pair of rollers on the other side of the retaining plate makes possible, with further advantage, determination of and an increase in the friction between the pairs of rollers and the guide rails when tightening and easing when loosening. By simple rotation of the eccentrically mounted roller, the retaining plate is pressed harder against the rollers resulting in increased friction. By rotating the respective eccentric rollers a required pre-tensioning is obtained in the most simple manner.

According to the invention at least one of the V-shaped guide rails can be interrupted approximately in the central area of its longitudinal extent by a cut-out. In the area of this cut-out extending in the direction of the rails, the V-shaped raised profile of the rail is, as it were, missing. The length of the cut-out is advantageously selected to be somewhat greater than the diameter of the respective roller used. The purpose of this measure is easy removal of the moveable sealing unit without having to completely remove the rollers. The two rollers of a pair are arranged at a distance apart from one another which is approximately the same size as the longitudinal extent of the retaining plate (in the direction of movement of the sealing jaw). The distance of the axle of one roller to the centre of the cut-out described is then selected to be the same size as the length of the guide rail which the respective other roller is from the end of the guide rail, with the result that when the roller moves into the cut-out (a relative movement as the retaining plate is always moved with respect to the stationarily mounted roller), at the same time the other roller runs out over the end of the guide rail, so that in the end both rollers are no longer engaged with the V-shaped cross-section of the guide rails, and the retaining plate together with the entire (moveable) sealing unit arranged thereupon can be removed from the rollers. The rollers are advantageously also rotatably attached to the retaining frame. Again, the maintenance-friendliness and good possibilities for cleaning the individual units of the sealing device according to the invention are evident.

It is also particularly advantageous when according to the invention the sealing jaw is configured as an ultrasound sonotrode which is securely connected to a converter attached to the retaining plate, and when the counter jaw is configured as an anvil. Ultrasound sealing has until now only be employed in non-aseptic fields for the sealing of gabled packages. By means of the measures and edge arrangements according to the invention the sealing unit can also be provided with a sonotrode.

A pneumatic system could be employed for the forced control of the sealing unit, the use of which does not appear possible due to the prerequisites of a clean room. As an exact pressure is needed for sealing the sealing seam, spring mounting, a spring element, for example a pneumatic pressure pad, is needed on the side of the counter jaw or of the anvil. This can only be produced pneumatically or hydraulically, however. Until now, because of the materials and the leaks among other things, neither a pneumatic nor a hydraulic system has been used in a clean room. By means of the use of germ-free water as the hydraulic fluid, the drive means can also be arranged in the clean room, however. Advantageously, hot air flows are no longer required for sterilising. The surfaces of the sealing device according to the invention can be sterilised with acids, the acids can be washed away with water, and important germ carriers such as, for example, the hot air used in the prior art, no longer need to be used in the clean room for the device according to the invention.

Figure 2:
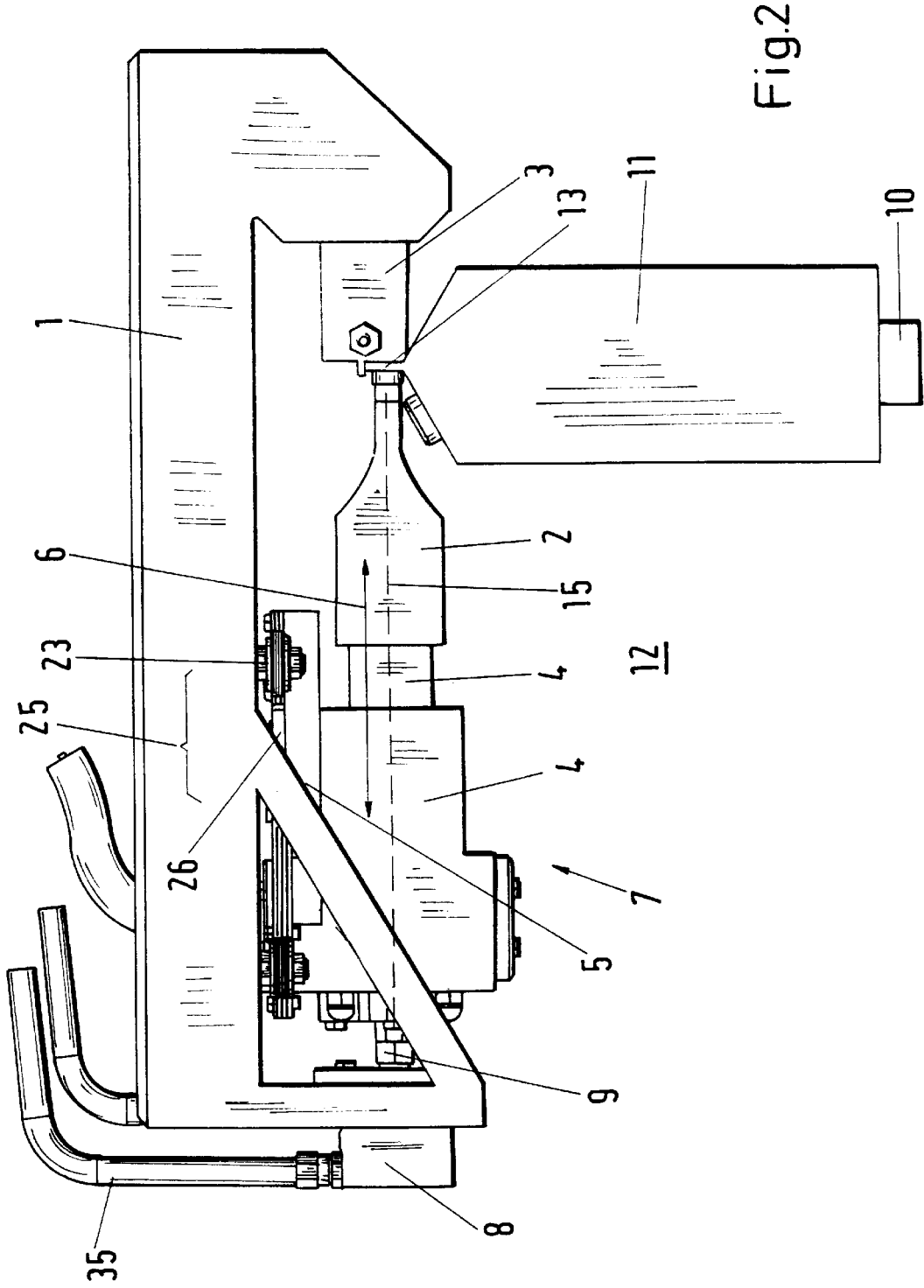
Figure 3:
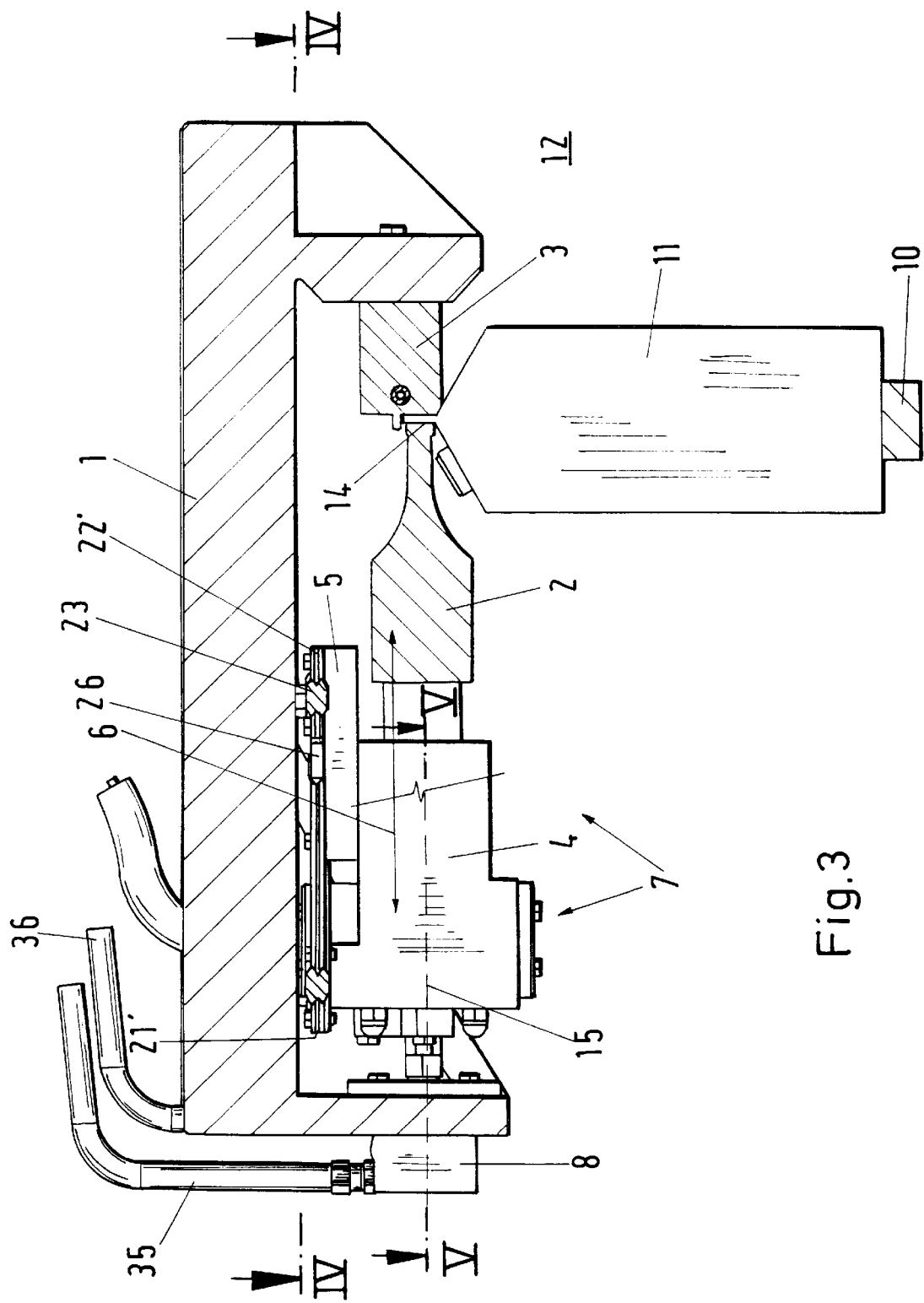
Figure 4:
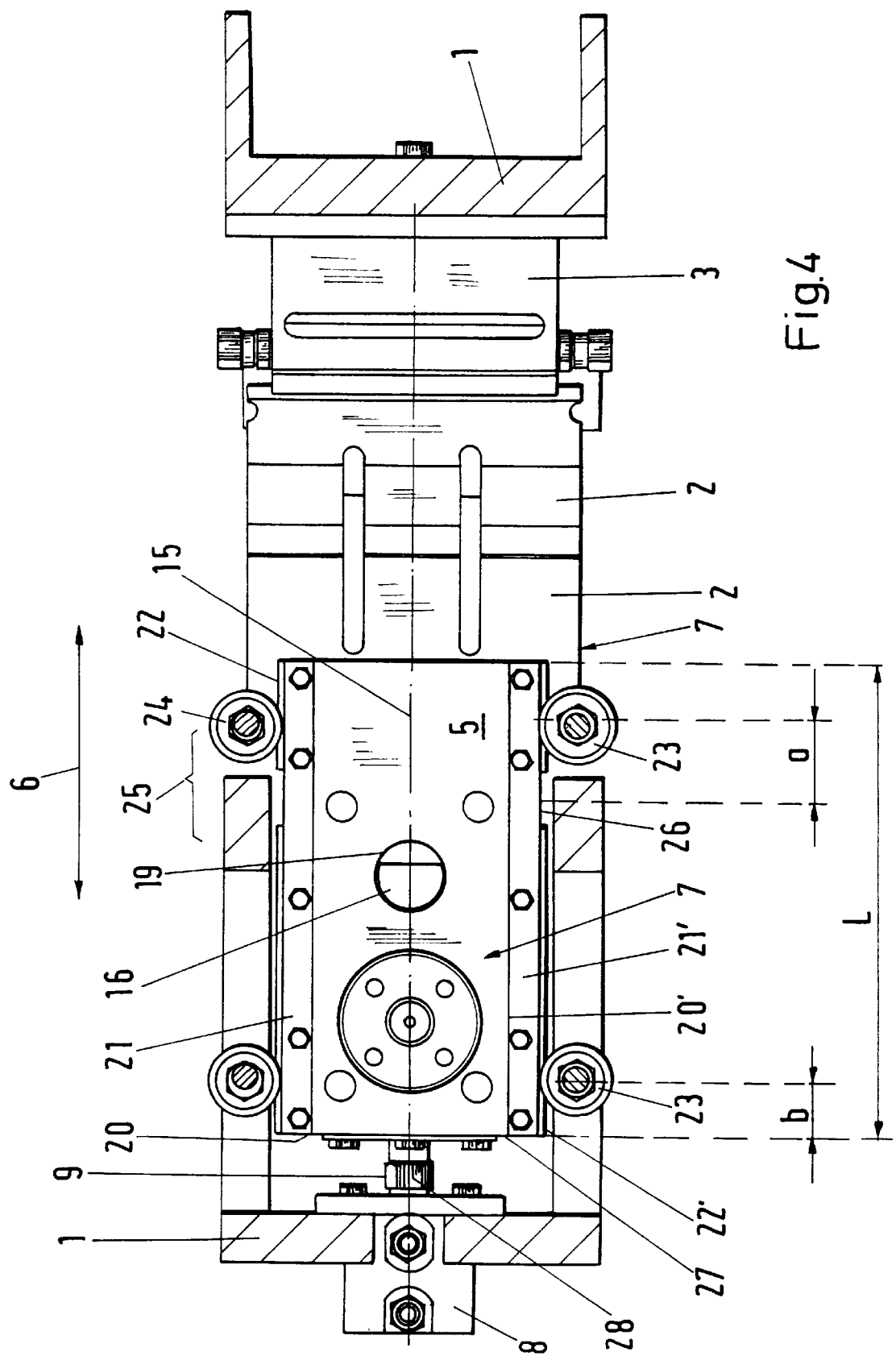
Figure 5:
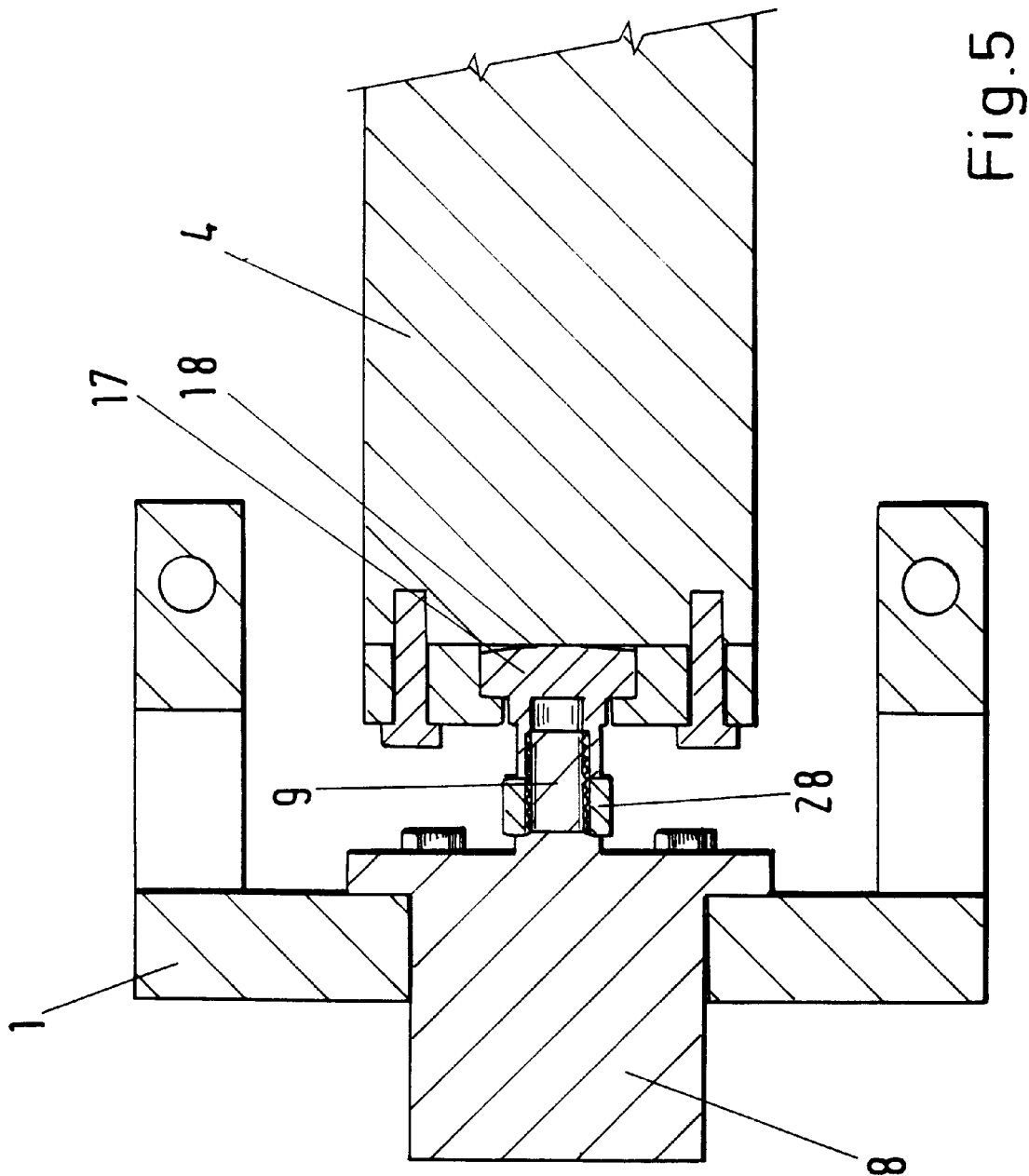
Figure 6:
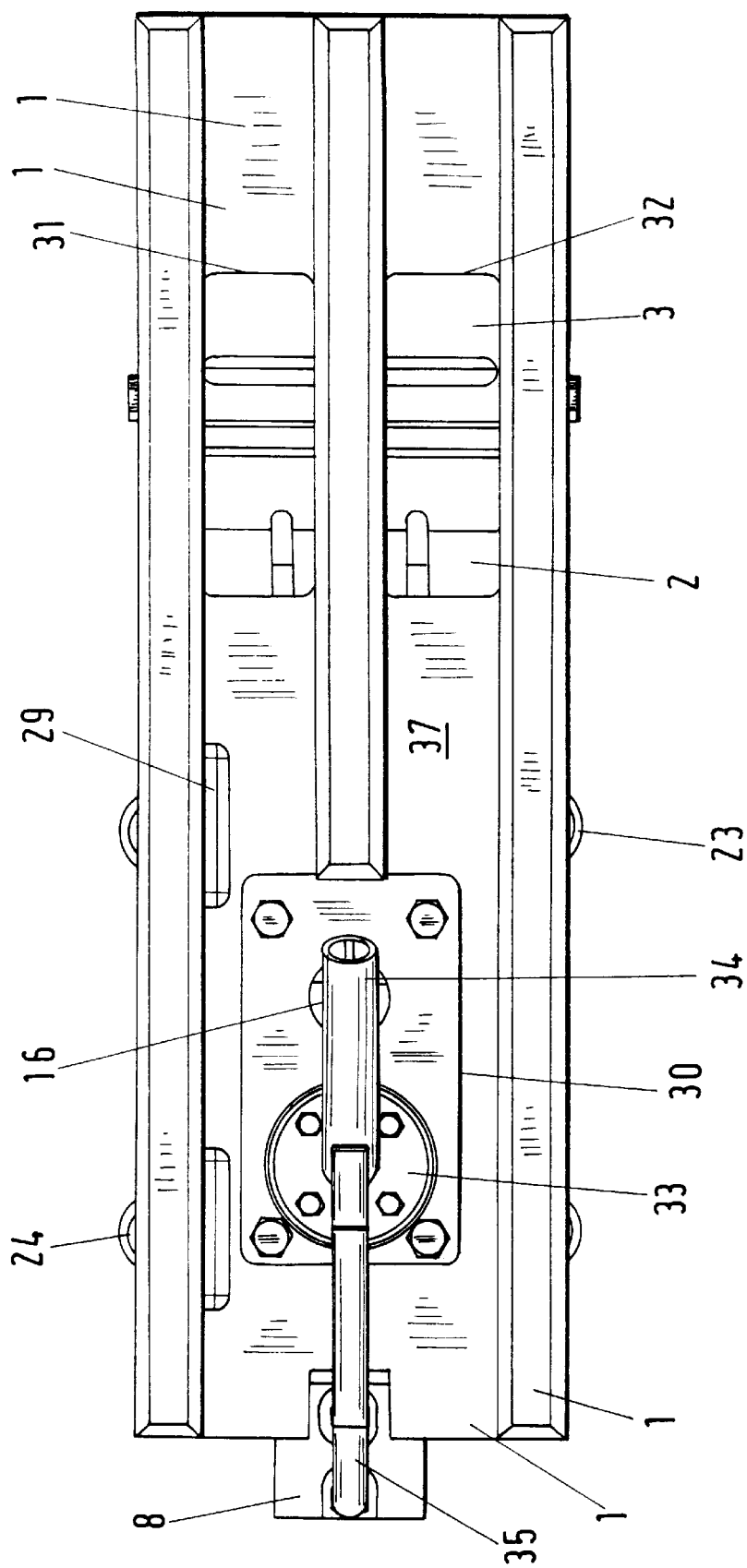

Further advantages, features and possibilities for application of the present invention will be evident from the following description with reference to the attached drawings. These show, in:

FIG. 1 in perspective, the frame of the sealing means with the sealing jaw and counter jaw, FIG. 2 a view from the side, when FIG. 1 is viewed from the bottom right to the top right, FIG. 3 a similar view to FIG. 2, wherein however the frame and other essential parts are shown in section, FIG. 4 partially in section, the plan view of the sealing jaw and counter jaw along the line IV—IV in FIG. 3, FIG. 5 an enlarged, cut-away view of the drive means with the mushroom, along the line V—V of FIG. 3, and FIG. 6 a plan view of the frame with the sealing means only partially visible beneath it, when viewed, for example in FIG. 2, from the top to the bottom.

Figure 7:
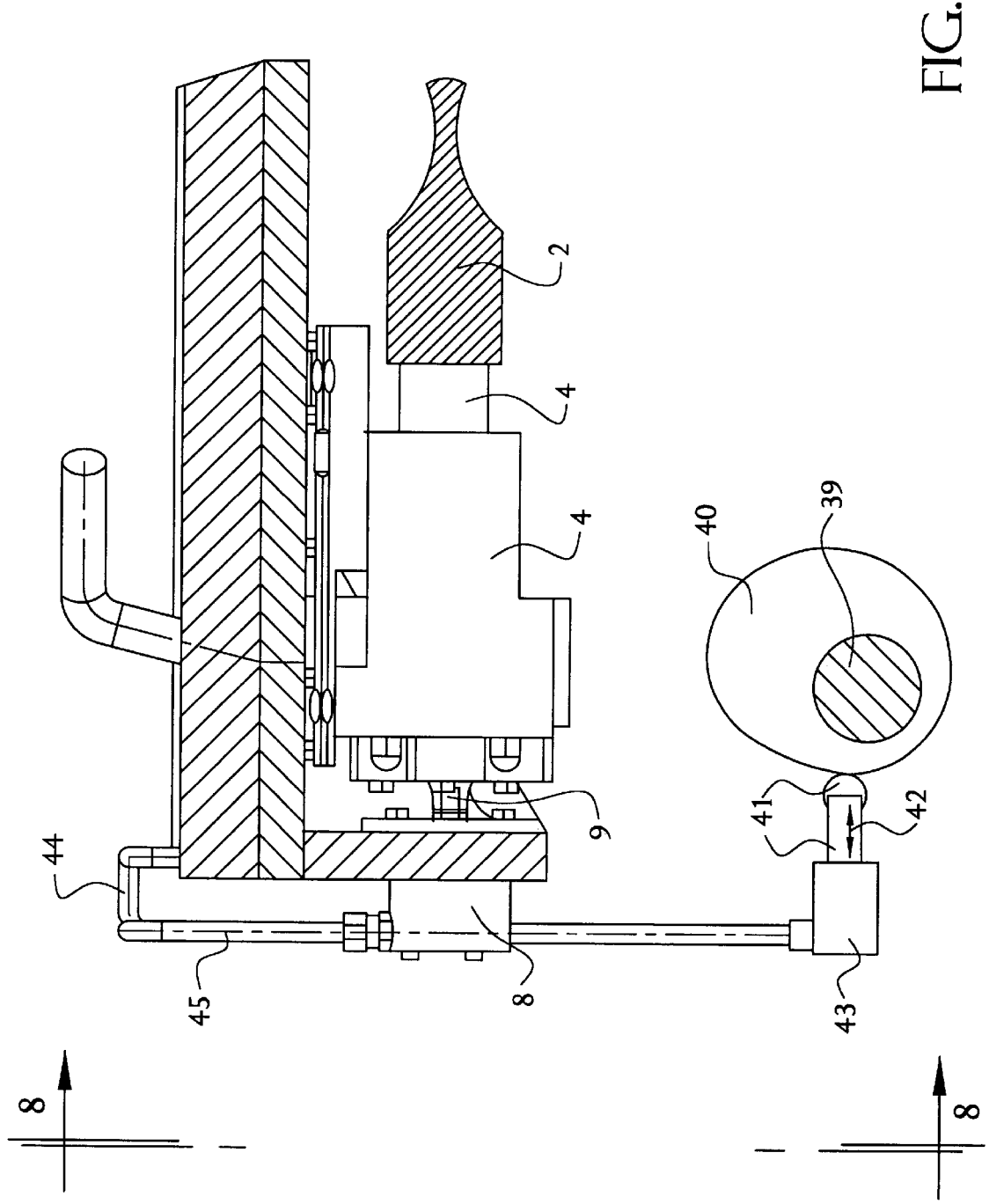

FIG. 7 a view from the side, when FIG. 1 is viewed from the bottom right to the top left, with the anvil and package removed and the sonotrode shown in a cross sectional view.

Figure 8:
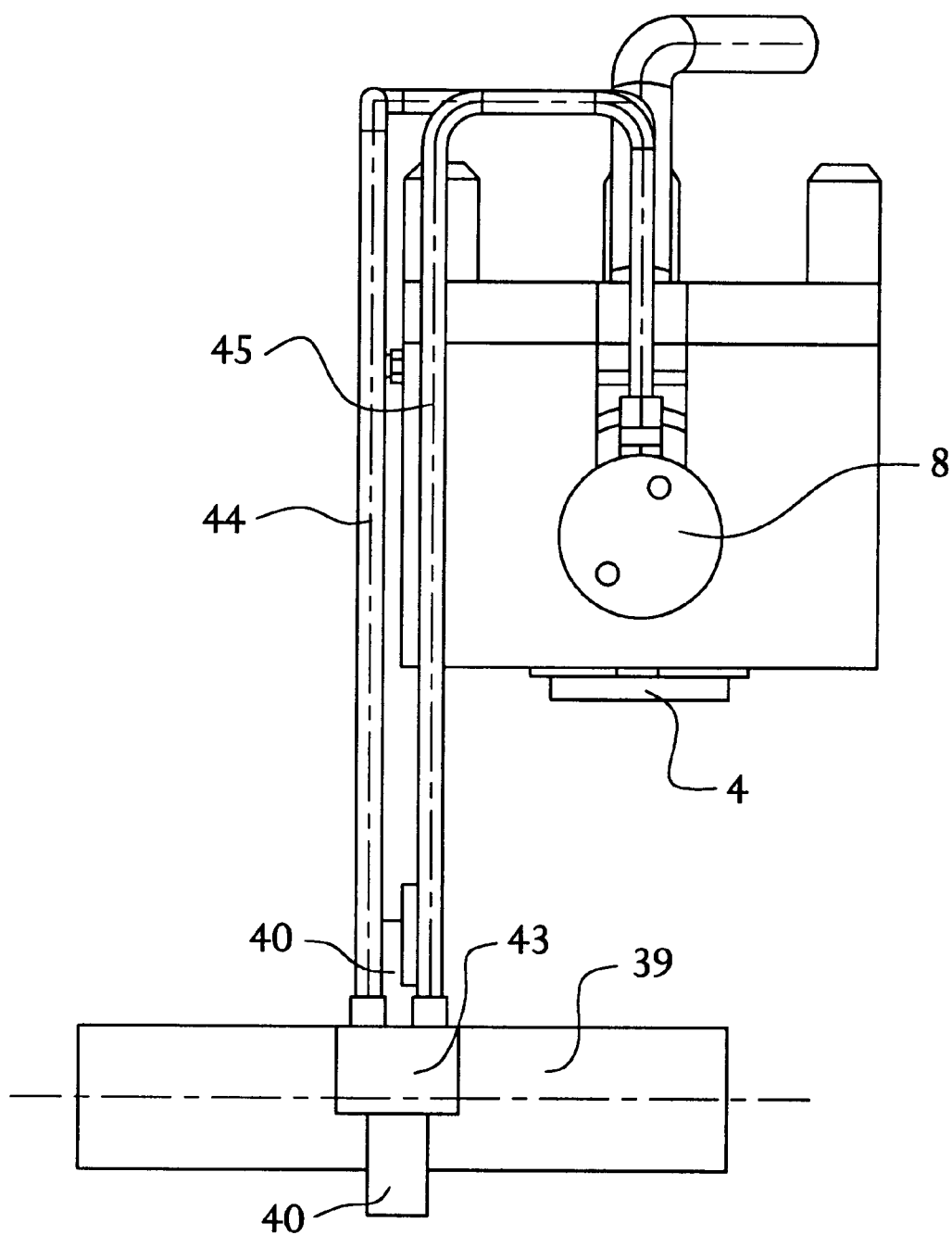

FIG. 8 a left side view of the drive means shown in FIG. 7.

The retaining frame 1, having three rails for bracing, retains the entire device and in this case in particular the sealing jaw configured as an ultrasound sonotrode, and the counter jaw configured as an anvil 3. A converter 4 is connected to the sonotrode 2. The sonotrode 2 together with the converter 4 is attached below the retaining frame 1 by means of a retaining plate 5. As a result the sonotrode 2 and the converter 4 are moveable in the direction of movement labelled 6, whereby this moveable unit is designated as a whole as the moveable sealing unit 7.

Opposite this, the drive 8 in the form of a hydraulic cylinder is securely fixed to the retaining frame. The piston rod 9 thereof can move the moveable sealing unit 7 backwards and forwards in the direction of the double arrow 6, that is to say the direction of movement of the unit 7.

All the parts shown here in the drawings, including the retaining frame 1 and the base rail 10 for the package 11, are located in a clean room 12 not shown with any outer limits. In this, the sealing seam 13 of the germ-free filled package 11 is to be sealed. This package is a gabled package manufactured from plastics coated paper, the gable of which is shown arranged in FIGS. 2 and 3 "at the top", above, that is to say opposite, the base rail 10. FIGS. 2 and 3 show how the ultrasound sonotrode 2 with its front surface 14 is conveyed against the sealing seam 13 of the package 11. With this the movement of the moveable sealing unit 7 effected by means of the drive means 8 is to the right half of the double arrow 6, that is to say a movement to the right towards the counter jaw or anvil 3. The axis of the piston rod 9 lies in the line of the direction of movement 6, and this line represents the principal line of force 15 from the drive means 8 on the one hand via the sealing jaw 2 as far as the counter jaw 3.

The moveable sealing unit 7 is, however, not exclusively moveable forwards and backwards in the direction of movement 6 in a translatory manner along this principal line of force 15. Instead, there is also rotary movement of this sealing unit 7, namely about a pin 16 clearly shown in FIGS. 4 and 6, the axis of rotation of which is on the principal line of force 15 and horizontally on a plane which lies in the principal line of force 15 and in the illustration in FIGS. 4 to 6 is the plane of the paper. With respect to FIGS. 2 and 3, this plane is in the direction of viewing and again comprises the principal line of force 15. In order that adjustment of this consequently also rotatably moveable sealing unit 7 on the axis of the piston rod 9 of the drive means 8 fitted onto the retaining frame 1 is possible, according to the representation in FIG. 5, a mushroom is fitted onto the front (in FIG. 5 the right-hand) end of the piston rod 9. The front surface 18 of this equalises a bend in the principle line of force 15 to the piston rod 9. In the way the power is actually transferred from the drive means 8 without bends directly onto the front surface 14 of the sonotrode 2 and thereby also onto the anvil 3.

The pin 16 is fixed to the moveable sealing means 7 and projects upwards therefrom in the direction of the retaining frame 1 and into a bore 19 in the retaining plate 5. The pin 16 terminates in this bore 19 in the retaining plate 5. The sealing unit 7 can thus rotate about the pin 16 relative to the retaining plate 5. The retaining plate 5 for its part is only moveable in the direction of the double arrow 6 in a translatory manner relative to the retaining frame 1.

For this purpose guide rails 21, 21' have been screwed onto the opposite edges 20, 20' extending in the direction of movement 6. The cross-section of these is V-shaped such that the outside edges of these guide rails 21, 21' taper towards the outside. The guide rails thus taper off outwards (as at the base of a V, at the point) into the outer edge labelled 22, 22'.

FIG. 4 shows the fixing of the moveable retaining plate 5 by means of a first lower pair of rollers 23, which are arranged rotatably on the retaining frame 1 at the top (see FIGS. 2 and 3); and opposite, at the other end of the retaining frame, at the top in FIGS. 4 and 6, a second upper pair of rollers 24 which are, however, clearly arranged eccentrically. With the aid of FIGS. 2 and 3, the V-cross section of the rollers 23 can be seen, corresponding to the V-profile of the guide rails 21, 21'. The opposite rollers 24 also have a corresponding V-shape on their periphery. The pair of rollers 23 shown arranged at the front in FIGS. 1 to 3 and at the bottom in FIGS. 4 and 6, is arranged in a centrically rotatable manner, while the opposite, second pair of rollers 24 is arranged eccentrically rotatable on the retaining frame 1.

A linear contact for good cleaning is provided by the V-profile described, that is to say a linear guide which also functions without lubricant. Any dirt accumulating nonetheless on the guide rails 21, 21' is pushed forwards or backwards by the pairs of rollers 23, 24 with each translatory movement in the direction of the double arrow 6, where the dirt can easily be removed.

The maintenance-friendliness of the entire construction of the sealing device is also particularly clear from the following detail. In the guide rails 21, 21', both V-shaped in cross-section, according to the clear representation, in particular in FIGS. 2 to 4, in the area 25, which could be the central area, but in this embodiment is the area of the right-hand third, there are provided cut-outs 26. The guide rails 21, 21' are therefore interrupted in this area 25. The V-shaped edge for guiding the rollers 23, 24 is, as it were, missing, with the result that when the retaining plate 5 is pushed in the direction of movement 6, when, for example, the right hand rollers 23, 24 in FIG. 4 come into this cut-out 26, the retaining plate 5 is no longer held by these right-hand rollers 23, 24 but instead can be disengaged from them despite the presence of the rollers 23, 24.

The distance a between the centre of the right-hand front outside edge 22 and respectively 22' of the guide rail 21 and respectively 21' and the centre of the cut-out 26 is larger than the distance b between the axle of the bottom left-hand roller 23 (FIG. 4) and the rear terminal edge 27 of the retaining plate 5. With this the total length of the retaining plate 5 is assumed as L. In an example it can be that L=100 mm, while a=5 mm and b≦5 mm. In this way after loosening the locking nut 28 for detaching the piston rod 9 from the mushroom-shaped clevis member or mushroom 17 (FIG. 5), that is to say after loosening the drive-side parts of the retaining plate 5 such as, for example, the mushroom 17, from the drive means 8 and the piston rod 9, pushing of the retaining plate 5, for example to the right in the direction towards the anvil 3 by the length a, is sufficient to bring the rear terminal edge 27 of the retaining plate in front of the respective rear roller of the upper pair of rollers 24 and also of the lower pair of rollers 23, while at the same time the cut-out 26 then lies in the area of the front rollers of the two pairs 23, 24, with the result that the retaining plate can be removed without needing to remove the centrically or eccentrically arranged pairs of rollers 23, 24. This considerably increases the production reliability and also the maintenance friendliness. The retaining plate 5 runs between the pairs of rollers 23, 24 without imposing any loading.

In order to bring into position the front terminal surface, arranged in the Figures at the left or front, of the counter jaw 3 configured as an anvil, exactly, parallel and flush with the front surface 14 of the sealing jaw 2 configured as a sonotrode, with a sealing seam 13 of the package 11 arranged between them, the moveable sealing unit 7 must be moved relative to the anvil 3. Thus firstly the sealing seam 13 of the package 11 is laid on the anvil, then the sealing unit 7 is moved in the direction of the double arrow to the right towards the anvil 3 (with the aid of the drive means 8 and its hydraulic cylinder driven with sterile water), and lastly, by loosening the connection between the drive means 8 and the mushroom 17, a possibility is produced for pivoting the sealing unit 7 by means of the pin 16 relative to the retaining plate 5, and the sealing unit 7 is rotated until the front surface 14 of the sonotrode 2 is parallel to the anvil 3. All connections and screw connections can be tightened again so that the sealing unit 7 is again securely attached to the retaining plate 5 in this adjusted setting, and this entire unit of the retaining plate 5 and sealing unit 7 is again securely connected to the drive means 8 and the piston rod 9. If the contact pressure of one pair of rollers 23 is insufficient with respect to the other 24, the eccentrically arranged upper rollers 24 can be removed via the cut-outs 29 in the frame (FIG. 6) and set differently. FIG. 6 further shows in a plan view of the frame 1, the limit lines 30, 31 and 32 of three cleaning apertures. The flange for the supply hose 34 for the converter 4 is labelled 33. The Figures also show the feed hose 35 and drain hose 36 for the hydraulic cylinder of the drive means 8. The surface labelled 37 in FIG. 6 in the frame 1 between the limit lines 30, 31, 32 of the cleaning apertures is an intermediate plane which can also be very clearly seen in perspective in FIG. 1.

The introduction of the forward and backward pushing forces to the moveable sealing unit 7 along the two directions of movement 6 forwards towards the anvil 3 and backwards away from this, is done by means of the water hydraulics described. By using sterile water the contamination of the surroundings (which would otherwise be a risk with hydraulic leaks) in the sterile area is excluded. The hydraulic cylinder of the drive 8 is, according to a particularly clear representation in FIG. 5, directly connected to the converter 4 and it runs on the guide rails 21, 21' which are V-shaped in cross-section. The pushing forwards by means of the drive means 8 described produces the actual welding stroke. Mechanical parts or guiding elements can advantageously be omitted as the introduction of the hydraulic power from the drive means 8 along the principal line of force 15 is directly into the welding area.

Referring to FIG. 7, wherein like reference numerals represent like components, the sonotrode 2 is shown with the anvil 3 and the package 11 removed, in a cross-sectional view with the converter 4 at the rearward side of the sonotrode 2, including the piston rod 9 and the drive with hydraulic cylinder 8. FIG. 8 shows the view of cam control drive 8 with the main drive shaft and eccentrically arranged cam 40. A cam follower 41 moveable in the direction of double arrow 42 senses the movement of the outer periphery of the cam 40 and is driven thereby, as shown best in FIG. 7. The cam control means is also shown with a hydraulic valve 43 wherein conduits 44 and 45 carry the hydraulic fluid.

I claim:

1. A device for sealing closed a seam of a germ-free filled package made from plastics coated support material in germ-free conditions in a clean room, in which a drive means is connected to a sealing jaw and positioned behind said sealing jaw in line with a path of travel of said sealing jaw, said drive means being fixed in a stationary manner to a retaining frame, wherein a counter jaw securely fixed onto the retaining frame is disposed in front of the sealing jaw along the path of travel of said sealing jaw for engaging the seam of the germ-free package between said sealing jaw and said counter jaw, wherein the drive means is provided with a hydraulic cylinder, including conduits and a hydraulic valve, wherein said conduits connect said hydraulic cylinder with said hydraulic valve, there being germ-free water provided as the hydraulic fluid which is carried within said conduits to control the drive means, wherein a piston rod is connected to the sealing jaw to move said sealing jaw into and out of engagement with the counter jaw, the piston rod being associated with said drive means for movement of said piston rod by said drive means in either direction along the path of travel of said sealing jaw.

2. The device according to claim 1, further comprising a converter and a retaining plate, wherein the sealing jaw includes a front surface, and wherein said sealing jaw and said converter comprise a movable sealing unit which is fitted between the drive means and the front surface of the sealing jaw onto a retaining plate, wherein said retaining plate is movable relative to the retaining frame in a direction substantially parallel to the path of travel of said sealing jaw.

3. The device according to claim 1, wherein the piston rod has an axis which lies along the path of travel of said sealing jaw, the piston rod axis being parallel to the line of path of said sealing jaw.

4. The device according to claim 1 or 3, wherein the hydraulic cylinder of the drive means is controlled by means of a cam control.

5. The device according to one of claim 1 or 3, further comprising a converter and a retaining plate, and wherein said sealing jaw and said converter comprise a movable sealing unit which is pivotable with respect to the retaining plate about a pin arranged substantially vertical and at right angles with respect to the path of travel of the sealing jaw.

6. The device according to one of claim 1 or 3, further comprising a converter, and wherein said sealing jaw and said converter comprise a movable sealing unit, and wherein a mushroom-shaped clevis member is interposed between the piston rod of the drive means and the movable sealing unit.

7. The device according to claim 1 or 3, further comprising a converter and a retaining plate, wherein the sealing jaw is configured as an ultrasound sonotrode which is securely connected to a converter fixed to the retaining plate, and that the counter jaw is configured as an anvil.

8. A device for sealing closed a seam of a germ-free filled package made from plastics coated support material in germ-free conditions in a clean room, in which a drive means is connected to a sealing jaw and positioned behind said sealing jaw in line with a path of travel of said sealing jaw, the drive means being connected to the sealing jaw and fixed in a stationary manner to a retaining frame, wherein a counter jaw securely fixed onto the retaining frame is disposed in front of the sealing jaw along the path of travel of said sealing jaw for engaging the seam of the germ-free package between said sealing jaw and said counter jaw, wherein the drive means is provided with a hydraulic cylinder, including conduits and a hydraulic valve, wherein said conduits connect said hydraulic cylinder with said hydraulic valve, there being germ-free water provided as the hydraulic fluid which is carried within said conduits to control the drive means, wherein a piston rod is connected to the sealing jaw to move said sealing jaw into and out of engagement with the counter jaw, the piston rod being associated with said drive means for movement of said piston rod by said drive means in either direction along the path of travel of said sealing jaw, wherein a retaining plate having opposite edges is movably connected to the retaining frame for movement in the direction of the path of travel of the sealing jaw, wherein guide rails having a v-shaped cross-section are fitted to opposite edges of the retaining plate extending along the path of travel of the sealing jaw, wherein two pairs of rollers are mounted to the retaining frame, and wherein the v-shaped cross-section of said guide rails tapers towards the outside and is held by said two pairs of rollers, said rollers having a corresponding v-shape on the periphery wherein one pair of rollers is arranged centrically rotatable on the retaining frame and the other pair of rollers is eccentrically rotatable.

9. The device according to claim 8, wherein the axis of the piston rod lies in the line of direction of movement which is the principal line of force from the drive means via the sealing jaw to the counter jaw.

10. The device according to claim 9, wherein at least one of said guide rails having a v-shaped cross-section is interrupted approximately in the central area of its longitudinal extent by a cut-out.

11. The device according to claim 8, wherein at least one of said guide rails having a v-shaped cross-section is interrupted approximately in the central area of its longitudinal extent by a cut-out.

12. The device according to claim 11, wherein the hydraulic cylinder of the drive means is controlled by means of a cam control.

13. The device according to claim 11, further comprising a converter, and wherein said sealing jaw and said converter comprise a movable sealing unit which is fitted between the drive means and a front surface of the sealing jaw onto a retaining plate arranged to be movable on the retaining frame in a translatory manner substantially parallel to the direction of movement of the sealing jaw.

14. The device according to claim 11, further comprising a converter, and wherein said sealing jaw and said converter comprise a movable sealing unit which is pivotable with respect to the retaining plate about a pin arranged substantially vertical and at right angles with respect to the direction of movement of the sealing jaw.

15. The device according to claim 11, further comprising a converter, and wherein said sealing jaw and said converter comprise a movable sealing unit, and wherein a mushroom-shaped clevis member is interposed between the piston rod of the drive means and the movable sealing unit.

16. The device according to claim 8, wherein the hydraulic cylinder of the drive means is controlled by means of a cam control.

17. The device according to claim 8, further comprising a converter, and wherein said sealing jaw and said converter comprise a movable sealing unit which is fitted between the drive means and a front surface of the sealing jaw onto a retaining plate arranged to be movable on the retaining frame in a translatory manner substantially parallel to the direction of movement of the sealing jaw.

18. The device according to claim 8, further comprising a converter, and wherein said sealing jaw and said converter comprise a movable sealing unit which is pivotable with respect to the retaining plate about a pin arranged substantially vertical and at right angles with respect to the direction of movement of the sealing jaw.

19. The device according to claim 8, further comprising a converter, and wherein said sealing jaw and said converter comprise a movable sealing unit, and wherein a mushroom-shaped clevis member is interposed between the piston rod of the drive means and the movable sealing unit.

* * * * *